(12) United States Patent
Lindoff et al.

(10) Patent No.: US 11,317,332 B2
(45) Date of Patent: Apr. 26, 2022

(54) METHOD FOR CELL SELECTION

(71) Applicant: Telefonaktiebolaget L M Ericsson (publ), Stockholm (SE)

(72) Inventors: Bengt Lindoff, Bjärred (SE); Peter Alriksson, Hörby (SE); Joakim Axmon, Kävlinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1400 days.

(21) Appl. No.: 14/895,336

(22) PCT Filed: Nov. 12, 2015

(86) PCT No.: PCT/EP2015/076403
§ 371 (c)(1),
(2) Date: Dec. 2, 2015

(87) PCT Pub. No.: WO2017/080598
PCT Pub. Date: May 18, 2017

(65) Prior Publication Data
US 2017/0265113 A1 Sep. 14, 2017

(51) Int. Cl.
*H04W 36/14* (2009.01)
*H04W 48/18* (2009.01)
(Continued)

(52) U.S. Cl.
CPC .......... *H04W 36/14* (2013.01); *H04W 36/22* (2013.01); *H04W 36/36* (2013.01); *H04W 48/18* (2013.01); *H04W 48/12* (2013.01); *H04W 84/042* (2013.01)

(58) Field of Classification Search
CPC .................................................. H04W 36/14
See application file for complete search history.

(56) References Cited

U.S. PATENT DOCUMENTS

| 7,088,694 B1* | 8/2006 | Rune | H04W 36/10 370/328 |
| 7,596,378 B1* | 9/2009 | Nizri | H04W 60/04 455/448 |

(Continued)

FOREIGN PATENT DOCUMENTS

| CN | 104168617 A | 11/2014 |
| WO | 2015103348 A1 | 7/2015 |

OTHER PUBLICATIONS

Siemens AG, "Background scan in HOLMN is part of the "Equivalent PLMNs" list", Change Request, 3GPP TSG-CN1 Meeting #24, Budapest, Hungary, May 13, 2002, pp. 1-2, Tdoc N1-021130, 3GPP.

(Continued)

*Primary Examiner* — Jung H Park
(74) *Attorney, Agent, or Firm* — Sage Patent Group

(57) ABSTRACT

A method of a wireless communication device operably connectable to a first cell of a first public land mobile network—PLMN—applying a first radio access technology—RAT, is disclosed. The method comprises detecting (301) a second cell of a second PLMN applying a second RAT and determining (302) whether a network relation exists between the first cell and the second cell. The method also comprises performing (304) a connection set up to the first cell if it is determined that a network relation exists between the first cell and the second cell, and performing (303) the connection set up to the second cell if it is determined that there does not exist a network relation between the first cell and the second cell. Also disclosed is an arrangement for a wireless communication device, a wireless communication device and a computer program product.

17 Claims, 3 Drawing Sheets

(51) Int. Cl.
  *H04W 36/22* (2009.01)
  *H04W 36/36* (2009.01)
  *H04W 48/12* (2009.01)
  *H04W 84/04* (2009.01)

(56) References Cited

U.S. PATENT DOCUMENTS

| | | | | |
|---|---|---|---|---|
| 8,594,011 | B2* | 11/2013 | Wang | H04W 76/10 370/315 |
| 8,989,742 | B2* | 3/2015 | Ramachandran | H04W 48/18 455/436 |
| 9,319,901 | B2* | 4/2016 | Shen | H04W 24/02 |
| 9,392,627 | B2* | 7/2016 | Zhou | H04J 11/0069 |
| 9,485,749 | B2* | 11/2016 | Narasimha | H04W 68/02 |
| 2004/0022226 | A1* | 2/2004 | Edlund | H04W 24/08 370/338 |
| 2004/0137927 | A1* | 7/2004 | Mun | H04W 48/16 455/509 |
| 2005/0202828 | A1* | 9/2005 | Pecen | H04W 36/0055 455/453 |
| 2008/0220778 | A1* | 9/2008 | Ekstedt | H04W 48/16 455/436 |
| 2011/0207453 | A1* | 8/2011 | Hsu | H04W 88/06 455/424 |
| 2012/0034878 | A1* | 2/2012 | Findlay | H04W 36/0088 455/67.11 |
| 2012/0302241 | A1* | 11/2012 | Klingenbrunn | H04W 48/16 455/436 |
| 2013/0053036 | A1* | 2/2013 | Gong | H04W 48/16 455/436 |
| 2013/0142136 | A1* | 6/2013 | Pi | H04W 28/0289 370/329 |
| 2013/0189987 | A1* | 7/2013 | Klingenbrunn | H04W 36/165 455/436 |
| 2013/0244660 | A1* | 9/2013 | Kumar | H04W 36/165 455/436 |
| 2013/0273887 | A1* | 10/2013 | Hole | H04W 36/08 455/411 |
| 2013/0308551 | A1* | 11/2013 | Madan | H04W 76/14 370/329 |
| 2013/0329694 | A1* | 12/2013 | Vrzic | H04W 36/165 370/331 |
| 2013/0337811 | A1* | 12/2013 | Faerber | H04W 36/0072 455/436 |
| 2014/0064158 | A1* | 3/2014 | Timus | H04W 36/30 370/279 |
| 2014/0140296 | A1* | 5/2014 | Choi | H04J 11/0036 370/329 |
| 2014/0256318 | A1 | 9/2014 | Ekici et al. | |
| 2014/0287753 | A1* | 9/2014 | Schulist | H04W 36/0022 455/436 |
| 2014/0378140 | A1* | 12/2014 | Gopal | H04W 76/048 455/437 |
| 2015/0071188 | A1* | 3/2015 | Nammi | H04J 11/005 370/329 |
| 2015/0085792 | A1* | 3/2015 | Reddy | H04L 5/0098 370/329 |
| 2015/0195755 | A1* | 7/2015 | Gulati | H04W 36/0061 455/436 |
| 2015/0282044 | A1* | 10/2015 | Balasubramanian | H04W 40/10 370/329 |
| 2015/0350955 | A1* | 12/2015 | Somasundaram | H04W 28/20 370/329 |
| 2015/0351014 | A1* | 12/2015 | Jung | H04W 48/18 370/338 |
| 2016/0050618 | A1* | 2/2016 | Kollu | H04W 48/18 455/418 |
| 2016/0057686 | A1* | 2/2016 | Yang | H04W 36/0016 370/332 |
| 2016/0057756 | A1* | 2/2016 | Nammi | H04W 72/0466 370/335 |
| 2016/0198382 | A1* | 7/2016 | Jung | H04W 36/22 370/331 |
| 2016/0219648 | A1* | 7/2016 | Awoniyi-Oteri | H04W 8/205 |
| 2016/0309400 | A1* | 10/2016 | Swaminathan | H04W 84/02 |
| 2016/0353361 | A1* | 12/2016 | Jung | H04W 48/12 |
| 2016/0366622 | A1* | 12/2016 | Yang | H04W 36/0083 |
| 2017/0019912 | A1* | 1/2017 | Ponukumati | H04W 72/1215 |
| 2017/0195908 | A1* | 7/2017 | Lee | H04W 28/08 |
| 2017/0195946 | A1* | 7/2017 | Jung | H04W 48/08 |
| 2017/0222861 | A1* | 8/2017 | Jung | H04W 4/70 |

OTHER PUBLICATIONS

3rd Generation Partnership Project, "Universal Mobile Telecommunications System (UMTS); LTE; Non-Access-Stratum (NAS) protocol for Evolved Packet System (EPS); Stage 3", Technical Specification, ETSI TS 124 301 V12.7.0, Jan. 1, 2015, pp. 1-358, (3GPP TS 24.301 version 12.7.0 Release 12), ETSI.

* cited by examiner

METHOD FOR CELL SELECTION

TECHNICAL FIELD

The present invention relates generally to the field of wireless communication. More particularly, it relates to mobility management for cell selection when a first and second cell applies a first and second RAT, respectively.

BACKGROUND

The field of mobile and telecommunication is an ever growing and rapidly developing field.

It is anticipated that in the fifth generation (5G) mobile communication system development there will typically be evolvement of the current Universal Mobile Telecommunication System Long Term Evolution (UMTS-LTE) system, which provides legacy networks such as 2G (e.g. Global System for Mobile communication, Time Division Multiple Access (GSM TMDA), 3G (e.g. UMTS Wideband Code Division Multiple Access (WCDMA) and 4G (e.g. WCDMA and Orthogonal Frequency Division Multiplexing (OFDM)), into the International Mobile Telecommunications for the year 2020 (IMT-2020) such as LTE next generation (LTE-NX). One purpose for IMT-2020 is to typically improve throughput and capacity compared to LTE. This may, for example, be achieved by increasing the sample rate (e.g. by a factor of 5) and also by enabling 5 times larger band width per carrier (100 MHz), IMT-2020 is also typically focusing on the use of higher carrier frequencies (above 5-10 GHz). Future 5G systems may also be based on a lean design where the transmission of broadcast signals, like master information blocks/system information blocks (MIB/SIB) or similar, synchronization (sync) and common reference symbols only are transmitted when necessary. One of the reasons for this is typically to reduce unnecessary interference as well as reducing the network node power consumption.

Another important aspect of 5G is that it typically should be tightly integrated with 4G, meaning that the handover (HO) and mobility between 4G and 5G should be fast and seamless.

Deploying a new Radio Access Technology typically brings a significant investment cost to the operator, especially if one needs to upgrade legacy RATs for tight interaction with the newly deployed RAT. Therefore, based on historical deployment of earlier cellular communication generations, the interaction between the RATs can be very rudimentary, especially at the initial employment.

The 5G cellular system may also open up for new operators that may not have any legacy system. Instead they will typically rely on roaming, i.e. where the 5G operator will pay a 4G operator in order for their subscribers to have coverage also in non-5G coverage areas. In this case it is also unlikely that the 4G and 5G system will be able to have tight interaction, due to the lack of a central node connecting the 4G and 5G cells to each other.

Hence, for tight interaction between cells utilizing the same or different RATs in all kind of deployment scenarios there is a need for device methods for fast and efficient cell selections while keeping coverage advantage as well as high throughput performance.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide fast and efficient methods for a wireless communication device, arrangements of a wireless communication device, wireless communication devices and computer program products for cell connection. Preferably, this is achieved while keeping coverage advantage as well as high throughput performance.

According to a first aspect this is achieved by a method of a wireless communication device operably connectable to a first cell of a first public land mobile network—PLMN—applying a first radio access technology—RAT.

The method comprises detecting a second cell of a second PLMN which applies a second RAT. The method also comprises determining whether a network relation exists between the first cell and the second cell. Also, the method comprises performing a connection set up to the first cell if it is determined that a network relation exists between the first cell and the second cell, and performing the connection set up to the second cell if it is determined that there does not exist a network relation between the first cell and the second cell.

Operably connectable may e.g. mean that the wireless communication device may wirelessly connect to the first cell for communication, e.g. when entering cell coverage. The wireless communication device may also disconnect from the cell, e.g. when moving out of cell coverage.

In some embodiments, the wireless communication device may already be connected to the first cell when the second cell is detected.

In some embodiments, the method may also comprise determining a need for connection prior to performing the connection set up and connect either to the first or the second cell based on the need for connection and the network relation.

In some embodiments, the need for connection may be a need for transmitting large amount of data and/or a need for fast transmission of data.

In some embodiments, the need for a connection may be determined by a Session Management Entity in a Non-Access Stratum layer (NAS).

The NAS may receive a request from an application processor, wherein the request comprises information of the data transfer.

The NAS may be comprised in the wireless communication device or in a NW node, then preferably within a mobility management entity (MME).

In some embodiments, determining whether a network relation exists between the first cell and the second cell may comprise determining whether the first PLMN of the first cell and the second PLMN of the second cell coincide.

In some embodiments, the first PLMN of the first cell and the second PLAN of the second cell may coincide if it is determined that the first PLMN and second PLMN are home PLMN—hPLMN—of the wireless communication device.

In some embodiments, determining whether a network relation exists between the first cell and the second cell may comprise determining whether there exists a backhaul connection between the first cell and the second cell.

For example, determining if a backhaul connection exists may in some embodiments be done when it is detected that the first PLMN is a visitor PLMN—vPLMN—and the second PLMN is a hPLMN.

In some embodiments, if a backhaul connection exists between the first cell and the second cell, it may still be possible to perform seamless cell switch (e.g. handover) of the wireless communication device even though the PLMN of the first cell and the PLMN of the second cell do not coincide.

In some embodiments, determining whether a network relation exists between the first cell and the second cell may further comprise reading first and second system information—SI—respectively associated with the first and second cells and comprising information indicative of a relationship between the first PLMN and the second PLMN, wherein the relationship implies that a network connection exists between the first cell and the second cell.

In some embodiments, the SI may be received by the wireless communication device through dedicated signaling from the first and/or second cell.

In some embodiments, the SI may comprise information explicitly stating that the relationship between the first PLMN and the second PLMN is a backhaul connection.

In some embodiments, the SI may comprise information indicative whether the first and/or second PLMN are vPLMN or hPLMN.

In some embodiments, information of backhaul connection may be received by the wireless communication device on the first cell in an application information table—AIT—broadcast associated with the second cell.

In some embodiments, the method may further comprise the wireless communication device camping on the first cell when the wireless communication device is in an idle or non active mode.

In some embodiments, the wireless communication device may avoid camping on the second cell when in idle or non active mode.

In some embodiments, the method may further comprise, after connection set up to the first cell, determining if a request for increased data is received and connecting to the second cell if it is determined that a request for increased data is received.

In some embodiments, a network node may decide that the wireless communication device should connect to the second cell and perform a hand over—HO—or any other type of cell switch e.g. connection release with redirect or a cell change order of the wireless communication device from the first cell to the second cell.

In some embodiments the increased data may be at least one of an increased transmission rate or an increased transmission size.

In some embodiments, the method may further comprise storing an indication of the first PLMN associated with the first cell and an indication of the second PLMN associated with the second cell in a memory of the wireless communication device.

In some embodiments, the indication may be stored in association with a respective geographical indication, e.g. GPS data.

In some embodiments, the method may further comprise that upon detecting a new cell, the wireless communication device may check its memory to see if an indication of a PLMN pertaining to the new cell is stored in the memory, and perform the connection set up based on the stored indication.

In some embodiments, the first RAT of the first cell may be a legacy-RAT. E.g. the first RAT may be a 2G, 3G or 4G RAT.

The 2G RAT may pertain to a global system for mobile communication—GSM—network. The 3G RAT may pertain to a universal mobile telecommunication system—UMTS network. The 4G RAT may pertain to a long term evolution—LTE—network.

In some embodiments, the second RAT may be a IMT-2020—RAT. E.g. the second RAT may be a 5G RAT.

A second aspect is a computer program product comprising a computer readable medium, having thereon a computer program comprising program instructions.

The computer program is loadable into a data-processing unit having a processor and a memory for storing the program instructions. The processor is configured to cause execution of the method according to the first aspect when the computer program is run by the data-processing unit.

A third aspect is an arrangement of a wireless communication device operably connectable to a first cell of a first public land wireless network—PLMN—applying a first radio access technology—RAT. The arrangement comprises a controller configured to cause detection of a second cell of a second PLMN applying a second RAT and cause determination of whether a network relation exists between the first cell and the second cell. Then the controller is configured to cause the wireless communication device to perform a connection set up to the first cell if it is determined that a network relation exists between the first cell and the second cell, and cause the wireless communication device to perform the connection set up the second cell if it is determined that there does not exist a network relation between the first cell and the second cell.

In some embodiments, the controller may further comprise a detector configured to detect the second cell.

In some embodiments, the controller may further comprise a determinator configured to determine whether a network relation exists between the first cell and the second cell.

In some embodiments, the controller may be further configured to cause determination of whether a network relation exists between the first cell and the second cell by causing determination of whether the first PLMN of the first cell and the second PLMN of the second cell coincide.

In some embodiments, the controller may be further configured to cause determination of whether a network relation exists between the first cell and the second cell by causing determination of whether there exist a backhaul connection between the first cell and the second cell.

In some embodiments, the controller may be further configured to cause determination of whether a network relation exists between the first cell and the second cell by causing reading of first and second system information—SI—respectively associated with the first and second cells and comprising information indicative of a relation between the first PLMN and the second PLMN, wherein the relationship implies that a network connection exists between the first cell and the second cell.

In some embodiments, the controller may be further configured to cause the wireless communication device to camp on the first cell when the wireless communication device is in an idle mode.

In some embodiments, the controller may be further configured to, after connection set up to the first cell, cause determination of if a request for increased data is received and cause a connection to the second cell if it is determined that a request for increased data is received.

In some embodiments, the controller may be further configured to cause a storing of an indication of the first PLMN associated with the first cell and an indication of the second PLMN associated with the second cell in a memory of the wireless communication device.

A fourth aspect is a wireless communication device comprising the arrangement according to the third aspect.

In some embodiments, the third and fourth aspects may additionally have features identical with or corresponding to any of the various features as explained above for the first aspect.

An advantage of some embodiments is that fast reselection between different RATs is enabled will still maximizing network coverage and high throughput.

Another advantage of some embodiments is that it is avoided that cells utilizing 5G RATs such as IMT-2020 are over encumbered by idle devices degrading the overall performance of the cell.

Another advantage of some embodiments is that overall network performance may be improved compared to prior art systems since a wireless communication device will connect to the system (legacy or LTE NX) providing best possible throughput while still maintaining low power consumption for both the network node and the wireless communication device by camping on the legacy system.

Another advantage of some embodiments is that a user which has subscribed to an IMT-2020 RAT may experience that the connection is to the subscribed RAT even though another RAT may be used by the camping cell, which will improve user satisfaction.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where overall network performance is enhanced in an environment with at least a first and a second RAT.

In some embodiments, the first and the second RAT may be the same type of RAT. E.g. the first and the second RAT may both be OFDM based-RATS In some embodiments, the first and the second RAT may be different types of RAT. E.g. the first RAT may be an UNITS based-RAT and the second RAT may be an OFDM based-RAT.

Figure 1:
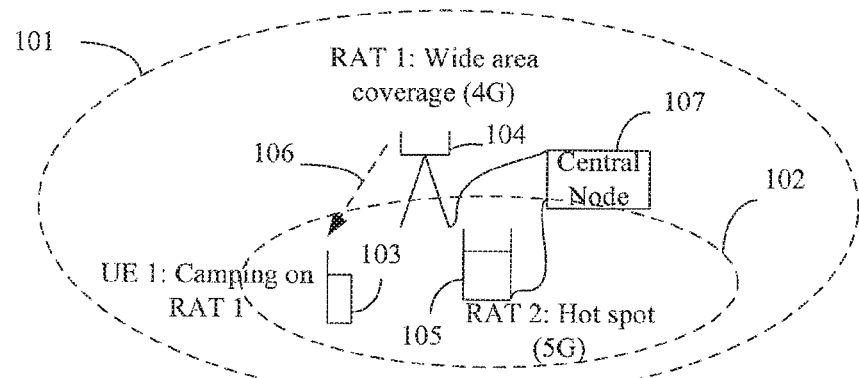
FIG. 1 is a schematic drawing illustrating a network scenario according to some embodiments.

FIG. 1 shows an example of a tightly integrated 4G, 5G system. FIG. 1 illustrates a first cell 101 using a first RAT (RAT 1) and a second cell 102 using a second RAT (RAT 2), the first and second cells having overlapping coverages. The first cell 101 is covered by a macro base station 104. The second cell is covered by a pico base station 105. Due to the lean 5G design (only transmitting few sync symbols with long DRX periods in order to be able to keep synchronization to the system during times of low activity) and the focus of 5G system to e.g. be a "booster" (e.g. taking over and providing fast throughput when the 4G system is not sufficient) to current 4G, UEs will typically be camping on 4G and only switch to 5G when necessary.

This is exemplified in FIG. 1, by that a wireless communication device UE 103 (UE 1) (in this disclosure the term user equipment, UE, or device may be used interchangeably with the term wireless communication device) in inactive (idle) mode is camping on 40 (RAT 1) (as illustrated by dotted arrow 106) and once a fast connection is needed, a fast HO or other type of cell switch to 5G (RAT 2) is made via the tight integration between 4G and 5G as illustrated by the central node 107 connecting the 4G cell and the 5G cell in an efficient manner. One proposal for such tight interaction, i.e. existing network relation, is that it is based on dual connectivity principles.

Figure 2:
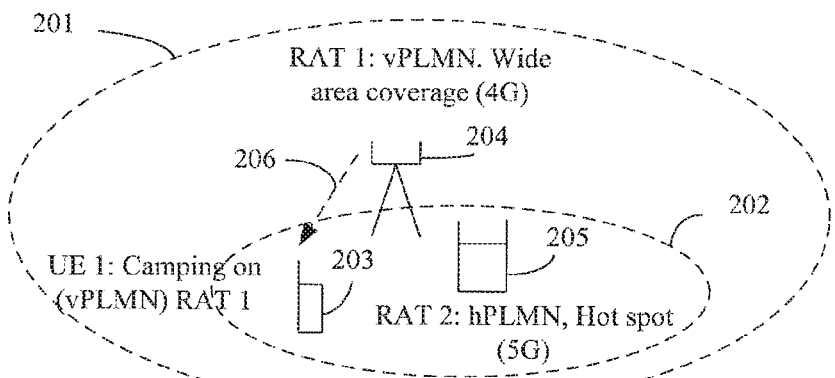
FIG. 2 is a schematic drawing illustrating a network scenario according to some embodiments.

FIG. 2 shows an example of a network scenario where the tight interaction between legacy and LIE NX is lacking, i.e. no network relation exists between the cells. FIG. 2 illustrates a first cell 201 using a first RAT (RAT 1), and a second cell 202 using a second RAT (RAT 2), the second cell being deployed within the coverage area of the first cell. The first cell 201 is covered by a macro base station 204. The second cell is covered by a pico base station 205.

A wireless communication device 203 (UE1) is located within both the coverage of the first cell 201 and the coverage of the second cell 202.

The first RAT may e.g. be a legacy RAT such as 4G and the second RAT may e.g. be a LTE NX RAT such as 5G.

The user equipment 203 which is associated with the 5G operator (i.e. 5G is its home PLMN) is in inactive (idle) mode and camping (as illustrated by dotted arrow 106) on the 4G RAT (which is a visiting PLMN, vPLMN), since there e.g. may be an intention not to have inactive devices on 5G RATs if legacy RATs are available.

Once the device needs a fast connection, a fast seamless mobility between 4G and 5G might be problematic due to a possible lack of interaction in the backhaul/core network, i.e. a possible lack of a network relation between the cells. One immediate solution to this problem is to allow the UE 203 to camp on the 5G system. However, then the lean design of the system might be ruined since the cell needs to transmit sufficiently many sync and pilot signals just for keeping the device in sync, hence encumbering the radio interface with unnecessary interference and also increase the risk for the device to drop connection due to the limited 5G coverage.

In order to ensure optimal network performance and fast seamless HO, or other cell switch, between cells utilizing legacy RATs and cells utilizing LTE NX RATs the inventors have realized after insightful and inventive reasoning that a proactive method for performing connection set up is needed.

Figure 3:
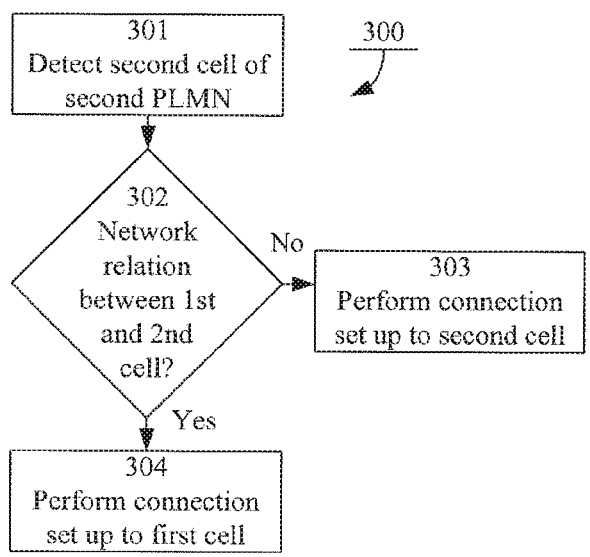
FIG. 3 is a flow chart illustrating method steps according to some embodiments.

FIG. 3 illustrates a method 300 according to some embodiments. The method 300 starts in 301 where a UE, being operably connectable to a first cell of a first public land mobile network—PLMN—applying a first radio access technology—RAT, has connected to and is camping on a first cell of a first PLMN and detects the presence of a second cell of a second PLMN applying a second RAT.

The UE may e.g. be the UE 103, 203 described in conjunction with any of FIGS. 1 and 2. The first cell and the second cell may in some embodiments correspond to the first and second cell 101, 102 described in conjunction with any of FIGS. 1 and 2.

The method continues in 302 where the UE determines whether a network relation exists between the first cell and the second cell.

If in 302 the UE determines that a network relation exists between the first cell and the second cell (Yes-path out of 302), the method continues to 304 where the UE performs a connection set up to the first cell. In this case, the UE will camp on the first cell on first RAT when in idle mode, and transmit on the first cell on first RAT when in active mode.

If in 302 the UE determines that a network relation does not exist between the first cell and the second cell (No-path out of 302), the method continues in 303 where the UE performs a connection set up to the second cell. In this case, the UE will camp on the first cell on first RAT in idle mode, and transmit on the second cell on second RAT when in active mode.

Various alternatives are possible in order to determine if there exists a network relation between the first cell and the second cell.

The UE may e.g. determine whether the first PLMN of the first cell and the second PLMN of the second cell coincide. The first PLMN and the second PLMN may coincide if they both are hPLMNs to the UE. A PLMN may be a hPLMN to the UE if both PLMN belong to the operator which the UE is associated with.

If the UE determines that the PLMN of the first cell differs from the PLMN of the second cell, e.g. the first PLMN may be a vPLMN and the second PLMN may be a hPLMN, then UE may determine if there instead exists a network relation between the cells by determining whether there exists a backhaul connection between the first cell and the second cell.

If the first and second PLMN coincide or if there exists a backhaul connection between the first and the second cell then fast and seamless handover or other cell reselection may be possible and the UE may perform connection set up to the first cell, knowing that the network node, if needed, can quickly perform a hand over to the second cell.

In order to determine the network relation, the UE may receive information from the cells.

The UE may e.g. read first and second system information—SI—respectively associated with the first and second cells and comprising information indicative of a relationship between the first PLAN and the second PLMN, respectively.

In some embodiments, the UE may determine the first PLMN by reading the master information block (MIB) of the first cell when the UE initially attaches to the first cell.

The UE may also receive information on the first PLMN through dedicated signaling from the first cell.

In some embodiments, the SI is broadcasted to the UE from the respective cell. Thus, the UE may receive information pertaining to the second PLMN when camping on the first cell, e.g. through a broadcasted application information table (AIT).

If a network relation is detected between the first and second cell, then the UE is configured to perform connection set up to the first cell since it is ensured that a fast HO or other type of cell switch to the second cell is enabled (compare with 302 of method 300). A HO or cell switch may be needed if the UE demands more transmission resources than can be readily supplied by the legacy RAT of the first cell. E.g., more data needs to be transmitted, or it may need to be transmitted at a higher rate. More data transmitted at a higher rate may also give rise to a need for changing to the second RAT.

In some embodiments, the UE may receive a request for increased data and the NW node may determine that the UE needs to be handed over to the second cell since the first cell cannot provide the needed throughput. A request for increased data may e.g. originate from a user of the UE requesting a demanding application to be carried out by the UE.

Figure 4:
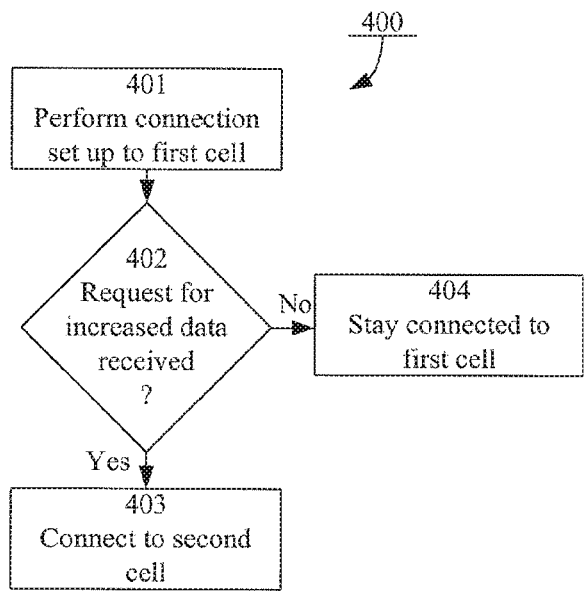
FIG. 4 is a flow chart illustrating method steps according to some embodiments.

In FIG. 4 method 400 illustrates such a scenario.

The method 400 may take off where the method 300 ended (compare with FIG. 3), The method step 401 may in some embodiments be equivalent to the method step 304 in FIG. 3.

In 401 the UE performs a connection set up to the first cell (e.g. the first cell described in conjunction with any of FIGS. 1 and 2). When connected to the first cell, the UE may keep track on whether it receives a request for increased data.

In 402 the UE determines if a request for increased data is received.

If a request for increased data is received (Yes-path out of 402), the UE connects to the second cell in step 403. The UE may in some embodiments perform the connection without assistance by the network node, or the UE may connect to the second cell e.g. through a fast HO assisted by the network node.

If a request for increased data has not been received (No-path out of 402), then the UE in 404 stays connected to the first cell.

In some embodiments, the network node pertaining to the first cell may decide when the UE should be handed over to the second cell, and perform a seamless fast HO using the tight connection between the first and the second cell. In such case, the UE may detect that there is a need for increased data and request a hand over of the network node, and the network node determines if a handover is necessary.

In some embodiments, the UE may further transmit the request for increased data to the Non-Access Stratum (NAS) of the network node. The network node may then determine based on the request if the legacy RAT of the first cell is sufficient for handling the data transmission or if a HO to the second cell and the IMT 2020 RAT should be performed.

The increased data may e.g. be at least one of an increased transmission rate or an increased transmission size.

In some embodiments, the UE may also assess its need for data transmission prior to determining to which cell it should connect to.

Figure 5:
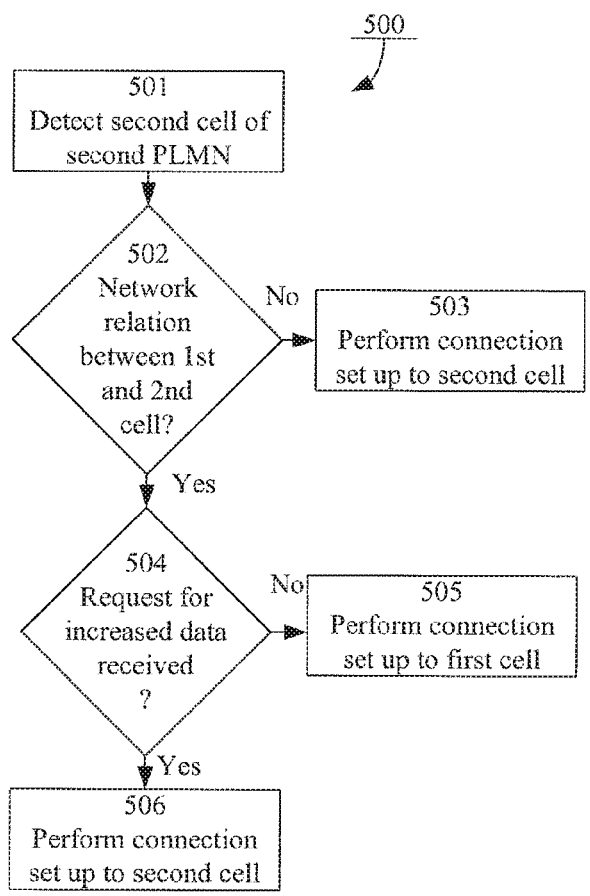
FIG. 5 is a flow chart illustrating method steps according to some embodiments.

Method 500 of FIG. 5 illustrates such a scenario. The method 500 may in some embodiments be combined with either or both of the method 300 and 400 of FIGS. 3 and 4.

The method 500 starts in 501 where a UE, being operably connectable to a first cell of a first public land mobile network PLMN applying a first radio access technology—RAT, has connected to a first cell of a first PLMN and detects the presence of a second cell of a second. PLMN applying a second RAT.

The UE may e.g. be the UE described in conjunction with any of FIGS. 1, 2, 3 and 4. The first cell and the second cell may in some embodiments correspond to the first and second cell described in conjunction with any of FIGS. 1, 2, 3 and 4.

The method continues in 502 where the UE determines whether a network relation exists between the first cell and the second cell.

If in 502 the UE determines that a network relation does not exist between the first cell and the second cell (No-path out of 502), the method continues in 503 where the UE performs a reselection to the second RAT and a connection set up to the second cell If in 502 the UE determines that a network relation exists between the first cell and the second cell (Yes-path out of 502), the method continues to 504 where the UE determines if there is a need for increased data by determining that a request for increased data is received.

If in 504 the UE determines that there is a need for increased data (Yes-path out of 504) then in 506 the UE performs connection set up to the second cell. In this case the UE will transmit on the second cell when in active mode and camp on the first cell when in idle mode. The UE may perform the connection without assistance by the network node, or the UE may connect to the second cell e.g. through a fast HO assisted by the network node.

If in 504 the UE determines that there is no need for increased data (No-path out of 504), then in 505 the UE performs a connection set up to the first cell. In this case, the UE will camp on the first cell when in idle mode, and transmit on the first cell when in active mode.

As elaborated on above for FIG. 4, the method 500 may also in some embodiments comprise that the UE when it has determined that a need for increased data exists, transmits a request for increased data to the network node, which determines if the UE should be handed over to the second cell or not based on the capacity of the first cell. E.g. if the first cell has sufficient resources to handle the increased data transmission of the UE, then the network node may decide not to hand over the UE to the second cell. Thus the IMT-2020 RAT is not unnecessarily encumbered.

Determining the network relation, i.e. if a fast hand over is possible, prior to determining to which cell the UE should connect to and performing the connection set up to the most suitable cell based on the determination of the network relation enables the UE to always camp on the legacy RAT of the first cell when in idle mode, while still having fast access to better throughput if/when needed.

In some embodiments, when the UE has determined the PLMNs of the first and second cell, the UE may store an indication of the first PLMN associated with the first cell and an indication of the second PLMN associated with the second cell in a memory of the wireless communication device.

In some embodiments, the first RAT of the first cell is a legacy-RAT such as 2G (e.g. GSM), 3G (e.g. UMTS) or 4G (e.g. LTE).

In some embodiments, the second RAT is a IMT-2020—RAT such as 5G.

When the UE detects a new cell, it may check in its memory if it comprises an indication of the PLMN pertaining to the new cell. Thus, the UE may quickly ascertain the type of PLMN and subsequently determine to what cell it should connect (e.g. by using any of the methods 300 or 500 as described in FIGS. 3 and 5).

The UE may also share with the network node the contents of its memory such that the network node may store in a database PLANS pertaining to different cells.

Figure 6:
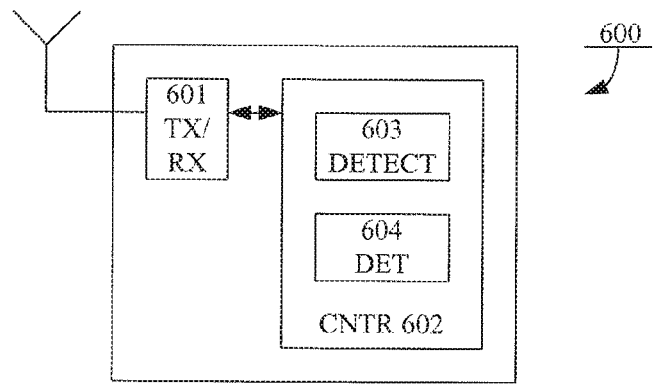
FIG. 6 is block diagram illustrating an arrangement of a wireless communication device according to some embodiments.

FIG. 6 illustrates an arrangement 600 of a wireless communication device operably connectable to a first cell of a first public land wireless network—PLMN—applying a first radio access technology—RAT. The arrangement 600 may in some embodiments be configured to carry out any of the methods 300, 400, and 500 described in FIGS. 3, 4 and 5. The arrangement 600 may also in some embodiments be comprised within a wireless communication device, e.g. the UE described in conjunction with any of the FIGS. 1, 2, 3, 4, and 5.

The arrangement 600 comprises a transceiver 601 (TX/RX), and a controller 602 (CNTR). The controller may comprise a detector 603 (DETECT) and a determiner 604 (DET).

The UE comprising the arrangement 600 may receive through transceiver 601 an indication of a presence of a second cell. The transceiver 601 relays the indication to the controller 602. The controller 602 may be configured to cause transceiver 601 to listen for an indication of the presence of a second cell at predetermined intervals. E.g. the UE may on regular basis perform a scan for new cells/RAT on different carriers being dependent on configured parameters. The parameters may be configured by the NW node and also be implementation specific in the UE.

The controller 602 relays the indication to the detector 603 which causes a detection of a second cell of a second PLMN applying a second RAT according to any suitable known or future method. The detector 603 may also detect the type of the PLMN, i.e. whether it is a hPLMN or a vPLMN.

The detector 601 may e.g. read a first and a second system information—SI—respectively associated with the first and second cells and comprising information indicative of a relation between the first PLMN and the second PLMN, respectively.

The SI may be broadcasted from the respective cell and received by transceiver 601. The SI pertaining to the first cell may also be received by the transceiver 601 through dedicated signaling from the network node of the first cell.

The controller 602 may also be configured to request information pertaining to the PLMN from the network upon initial attachment to the first cell.

The determiner 604 then determines whether a network relation exists between the first cell and the second cell based on the detected PLMNs by causing determination of whether the first PLMN of the first cell and the second PLMN of the second cell coincide.

If it is detected that the first PLMN and the second PLMN are both hPLMNs then the determiner 604 may determine that PLMNs coincide and a network relation exists between the first cell and the second cell.

If it is determined that the first PLMN is a vPLMN and the second PLMN is a hPLMN, and no backhaul connection exists, then the determiner 604 may determine that there does not exist a network relation between the first cell and the second cell (compare with 302 and 502 of method 300 and 500).

In some embodiments, the determiner may determine that a backhaul connection exists by reading broadcast information from the vPLMN comprising information about the hPLMN. If the broadcast information of the vPLMN does not comprise any information about the hPLMN, then that is an indication that no backhaul connection exist between the first and the second cell.

If the determiner 604 determines that there exists a network relation between the first cell and the second cell, then the controller 602 may cause the wireless UE to perform a connection set up to the first cell.

If the determiner 604 determines that there does not exist a network relation between the first cell and the second cell, then the controller 602 may cause the UE to perform the connection set up the second cell.

If the UE connects to the first cell, the determiner may also determine that a need for increased data transmission exists (compare with method 400 and 500 of FIGS. 4 and 5). The UE may e.g. execute an application which requires transmission of increased amounts of data, or at a faster rate. If a need for increased data transmission is determined, the controller 602 may issue a request for increased data which is relayed by means of the transceiver 601 to a network node of the first cell.

The network node may then determine if the first cell has sufficient resources to handle the increased data rate or if the UE should be handed over to the second cell. If the UE is handed over to the second cell, the controller 602 may connect to the second cell.

Figure 7:
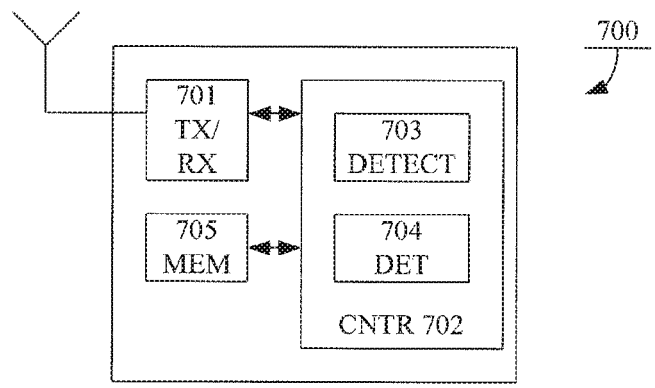
FIG. 7 is block diagram illustrating an arrangement of a wireless communication device according to some embodiments.

FIG. 7 illustrates an arrangement 700 of a wireless communication device operably connectable to a first cell of a first public land wireless network—PLMN—applying a first radio access technology—RAT.

The arrangement 700 may in some embodiments be configured to carry out any of the methods 300, 400, and 500 described in FIGS. 3, 4 and 5. The arrangement 700 may also in some embodiments be comprised within a wireless communication device, e.g. the UE described in conjunction with any of the FIGS. 1, 2, 3, 4, 5 and 6.

The arrangement 700 comprises a transceiver 701 (TX/RX) controller 702 (CNTR), a detector 703 (DETECT) a determiner 704 (DET) and a memory 705.

The UE comprising the arrangement 700 may receive through transceiver 701 an indication of a presence of a second cell. The transceiver 701 relays the indication to the controller 702. The controller 702 may be configured to cause transceiver 701 to listen for an indication of the presence of a second cell at predetermined intervals.

The controller 702 relays the indication to the detector 703 which causes a detection of a second cell of a second PLMN applying a second RAT according to any suitable known of future method. The detector 703 may also detect the type of the PLMN, i.e. whether it is a hPLMN or a vPLMN.

The detector 701 may e.g. read a first and a second system information—SI—respectively associated with the first and second cells and comprising information indicative of a relation between the first PLMN and the second PLMN, respectively.

The SI may be broadcasted from the respective cell and received by transceiver 701. The SI pertaining to the first cell may also be received by the transceiver 701 through dedicated signaling from the network node of the first cell.

The controller 702 may also be configured to request information pertaining to the PLMN from the network upon initial attachment to the first cell.

The determiner 704 then determines if whether a network relation exists between the first cell and the second cell based on the detected PLMNs by causing determination of whether the first PLMN of the first cell and the second PLMN of the second cell coincide (compare with method 300 and 500 in FIGS. 3 and 5).

If it is detected that the first PLMN and the second PLMN are both hPLMNs then the determiner 704 may determine that PLMNs coincide and a network relation exists between the first cell and the second cell.

If it is determined that the first PLMN is a vPLMN and the second PLMN is a hPLMN, and no backhaul connection exists, then the determiner 704 may determine that there does not exist a network relation between the first cell and the second cell.

If the determiner 704 determines that there exists a network relation between the first cell and the second cell, then the controller 702 may cause the wireless UE to perform a connection set up to the first cell (compare with method 300 and 500 of FIGS. 3 and 5).

If the determiner 704 determines that there does not exist a network relation between the first cell and the second cell, then the controller 702 may cause the UE to perform the connection set up the second cell.

The controller 702 may also cause the detector 703 to store an indication of the first PLMN associated with the first cell and an indication of the second PLMN associated with the second cell in the memory 705.

The memory 705 may thus comprise a history of cells and PLMNs pertaining to the cell. A UE comprising the arrangement 700 may thus check its history when detecting a new cell to see if the cell and its pertaining PLMN is already stored in memory. Thus, the UE may quickly determine if a network relation exists between the first and the second cell.

In some embodiments, the controller 702 may be configured to transmit the contents of the memory 705 by means of transceiver 701 to a network node of the first cell. The network node may store the contents in a database accessible by other UEs in the network. Thus knowledge about neighboring cells and their PLMNs may be easily spread.

In some embodiments, if the UE connects to the first cell, the determiner 704 of the arrangement 700 may also determine that a need for increased data transmission exists (compare with method 400 and 500 of FIGS. 4 and 5). The UE may e.g. execute an application which requires transmission of increased amounts of data, or at a faster rate. If a need for increased data transmission is determined, the controller 702 may issue a request for increased data which is relayed by means of the transceiver 701 to a network node of the first cell.

The network node may then determine if the first cell has sufficient resources to handle the increased data rate or if the UE should be handed over to the second cell. If the UE is handed over to the second cell, the controller 702 may connect to the second cell.

Figure 8:
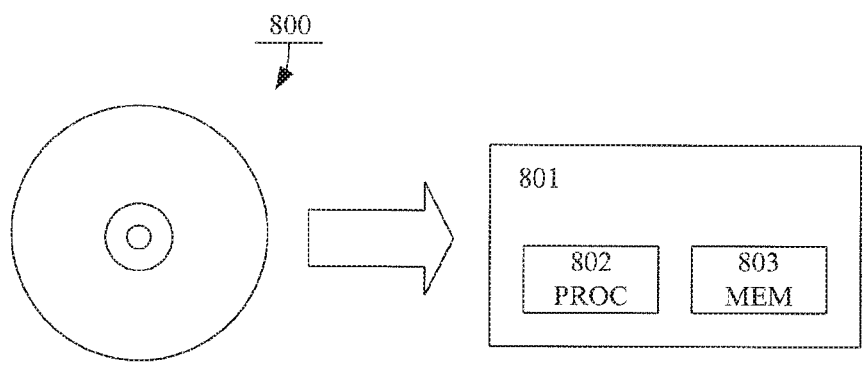
FIG. 8 is a schematic drawing illustrating a computer program product according to some embodiments.

FIG. 8 illustrates a computer program product according to some embodiments. The computer program product comprises a computer readable medium 800, having thereon a computer program comprising program instructions.

The computer program is loadable into a data-processing unit 801 having a processor (PROC) 802 and a memory (MEM) 803 for storing the program instructions.

The processor 802 may be e.g. configured to cause execution of the method according described in any of the FIGS. 3, 4 and 5 when the computer program is run by the data-processing unit.

Some of the embodiments described herein facilitates device methods for fast and efficient cell selections while keeping coverage advantage as well as high throughput performance By proactively determining upon detection of a new cell if it has any relation to the current cell, the wireless communication device may ensure its data transmission will not suffer due to lacking resources of the cell. It is also ensured that no unnecessary camping is done by wireless communication devices on a RAT which is designed to provide lean and high throughput, thus over encumbering the high throughput RAT and spoiling its purpose.

Some of the embodiments described herein provides maximum tradeoff between area coverage and throughput since the devices according to the embodiments camps on cells having large coverage and only transmits on cells with high throughout when needed, while avoiding camping on the high throughput cells.

Some of the described embodiments herein provides for fast and efficient connection to the cell most suitable for the needs of a wireless communication device.

Some of the described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as the wireless communication device described herein) comprising circuitry/logic or performing methods according to any of the embodiments. The electronic apparatus may, for example, be a portable or handheld mobile radio communication equipment, a mobile radio terminal, a mobile telephone, a pager, a communicator, an electronic organizer, a smartphone, a computer, a notebook, a USB-stick, a plug-in card, an embedded drive, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of operating a wireless communication device operably connectable to a first cell of a first public land mobile network (PLMN) applying a first radio access technology (RAT), the method comprising:
   detecting a second cell of a second PLMN applying a second RAT;
   determining whether a network relation exists between the first cell and the second cell, wherein the network relation is determined to exist when network nodes of the first and second cells have a common backhaul or core network;
   performing a connection set up to the first cell in response to determining that a network relation exists between the first cell and the second cell;
   performing the connection set up to the second cell in response determining that there does not exist a network relation between the first cell and the second cell.

2. The method of claim 1, wherein determining whether a network relation exists between the first cell and the second cell comprises determining whether the first PLMN of the first cell and the second PLMN of the second cell coincide.

3. The method of claim 1, wherein determining whether a network relation exists between the first cell and the second cell comprises determining whether there exists a backhaul connection between the first cell and the second cell.

4. The method of claim 1, wherein determining whether a network relation exists between the first cell and the second cell comprises reading first and second system information (SI), respectively associated with the first and second cells, the SI comprising information indicative of a relationship between the first PLMN and the second PLMN, wherein the relationship implies that a network connection exists between the first cell and the second cell.

5. The method of claim 1, further comprising camping on the first cell when the wireless communication device is in an idle mode.

6. The method of claim 1, further comprising, after connection set up to the first cell:
   determining if a request for increased data is received;
   connecting to the second cell in response to determining that a request for increased data is received.

7. The method of claim 6, wherein the increased data is at least one of an increased transmission rate or an increased transmission size.

8. The method of claim 1, further comprising storing an indication of the first PLMN associated with the first cell and an indication of the second PLMN associated with the second cell in a memory of the wireless communication device.

9. A computer program product stored in a non-transitory computer readable medium for controlling operation of a wireless communication device operably connectable to a first cell of a first public land mobile network (PLMN) applying a first radio access technology (RAT), the computer program product comprising software instructions which, when run on a processing circuit of the wireless communications device, causes the wireless communications device to:
   detect a second cell of a second PLMN applying a second RAT;
   determine whether a network relation exists between the first cell and the second cell, wherein the network relation exists when network nodes of the first and second cells have a common backhaul or core network;
   perform a connection set up to the first cell in response to determining that a network relation exists between the first cell and the second cell;
   perform the connection set up to the second cell in response determining that there does not exist a network relation between the first cell and the second cell.

10. An arrangement of a wireless communication device operably connectable to a first cell of a first public land wireless network (PLMN) applying a first radio access technology (RAT), the arrangement comprising:
   a processing circuit configured to function as a controller configured to:
      cause detection of a second cell of a second PLMN applying a second RAT;
      cause determination of whether a network relation exists between the first cell and the second cell, wherein the network relation exists when network nodes of the first and second cells have a common backhaul or core network; and cause the wireless communication device to perform a connection set up to the first cell in response to determining that a network relation exists between the first cell and the second cell; and cause the wireless communication device to perform the connection set up to the second cell in response to determining that there does not exist a network relation between the first cell and the second cell.

11. The arrangement of claim 10, wherein the controller is configured to cause determination of whether a network relation exists between the first cell and the second cell by causing determination of whether the first PLMN of the first cell and the second PLMN of the second cell coincide.

12. The arrangement of claim 10, wherein the controller is configured to cause determination of whether a network relation exists between the first cell and the second cell by causing determination of whether there exist a backhaul connection between the first cell and the second cell.

13. The arrangement of claim 10, wherein the controller is configured to cause determination of whether a network relation exists between the first cell and the second cell by causing reading of first and second system information (SI), respectively associated with the first and second cells, the SI comprising information indicative of a relation between the first PLMN and the second PLMN, wherein the relationship implies that a network connection exists between the first cell and the second cell.

14. The arrangement of claim 10, wherein the controller is configured to cause the wireless communication device to camp on the first cell when the wireless communication device is in an idle mode.

15. The arrangement of claim 10, wherein the controller is configured to cause, after connection set up to the first cell:

determination of whether a request for increased data is received; and the wireless communication device to connect to the second cell in response to determining that a request for increased data was received.

16. The arrangement of claim 10, wherein the controller is configured to cause storage of an indication of the first PLMN associated with the first cell and an indication of the second PLMN associated with the second cell in a memory of the wireless communication device.

17. A wireless communication device operably connectable to a first cell of a first public land wireless network (PLMN) applying a first radio access technology (RAT), the wireless communications device comprising:

a processing circuit configured to function as a controller configured to:

cause detection of a second cell of a second PLMN applying a second RAT;

cause determination of whether a network relation exists between the first cell and the second cell, wherein the network relation exists when network nodes of the first and second cells have a common backhaul or core network; and cause the wireless communication device to perform a connection set up to the first cell in response to determining that a network relation exists between the first cell and the second cell; and cause the wireless communication device to perform the connection set up to the second cell in response to determining that there does not exist a network relation between the first cell and the second cell.

* * * * *